United States Patent
Hariharan et al.

(10) Patent No.: US 9,745,967 B2
(45) Date of Patent: Aug. 29, 2017

(54) THERMAL ENERGY HARVESTING DEVICE

(75) Inventors: Subramaniya Hariharan, Akron, OH (US); Erik Engeberg, Cuyahoga Falls, OH (US)

(73) Assignee: The University of Akron, Akron, OH (US)

( * ) Notice: Subject to any disclaimer, the term of this patent is extended or adjusted under 35 U.S.C. 154(b) by 534 days.

(21) Appl. No.: 14/115,466

(22) PCT Filed: May 2, 2012

(86) PCT No.: PCT/US2012/036059
§ 371 (c)(1),
(2), (4) Date: Nov. 4, 2013

(87) PCT Pub. No.: WO2012/151241
PCT Pub. Date: Nov. 8, 2012

(65) Prior Publication Data
US 2014/0083095 A1 Mar. 27, 2014

Related U.S. Application Data

(60) Provisional application No. 61/482,857, filed on May 5, 2011.

(51) Int. Cl.
*F03G 7/06* (2006.01)
*H02K 7/18* (2006.01)

(52) U.S. Cl.
CPC ............ *F03G 7/065* (2013.01); *H02K 7/1807* (2013.01)

(58) Field of Classification Search
CPC .. F03G 7/06; F03G 7/065; G01K 5/68; H02N 3/00
USPC .................................. 60/527–529; 310/306
See application file for complete search history.

(56) References Cited

U.S. PATENT DOCUMENTS

| 3,678,685 | A | * | 7/1972 | Low | ............ | F03G 6/00 60/529 |
| 4,197,712 | A | * | 4/1980 | Zwick | ............ | F17C 9/02 60/618 |
| 4,325,217 | A | * | 4/1982 | Golestaneh | ............ | F03G 7/065 116/218 |
| 5,219,034 | A | * | 6/1993 | Wortham | ............ | B60K 1/00 180/65.1 |

(Continued)

OTHER PUBLICATIONS

Ean H Schiller; "Heat Engine Driven by Shape Memory Alloys: Prototyping and Design"; 80 pages; Sep. 19, 2002; Virginia Polytechnic Institute and State University.

*Primary Examiner* — Mark Laurenzi
*Assistant Examiner* — Mickey France
(74) *Attorney, Agent, or Firm* — Renner Kenner Greive Bobak Taylor & Weber

(57) ABSTRACT

A thermal energy harvesting device includes a rotatable shaft and a shape memory alloy element secured to rotatable shaft. The shape memory alloy element is adapted to undergo a shape memory effect upon reaching a transition temperature, which causes rotation of the rotatable shaft. The rotatable shaft may be operatively connected to a generator or tachometer to convert the rotation of the shaft into electrical energy, which may then be stored in a rechargeable battery. In certain embodiments a gear box may be provided to increase the speed of rotation, and thereby increase the amount of electrical energy created.

22 Claims, 10 Drawing Sheets

(56) References Cited

U.S. PATENT DOCUMENTS

| | | | | |
|---|---|---|---|---|
| 5,279,123 A * | 1/1994 | Wechsler | ............... | F03G 7/065 60/527 |
| 5,396,769 A * | 3/1995 | Brudnicki | ............... | F03G 7/065 60/527 |
| 6,323,619 B1 * | 11/2001 | El-Ibiary | ............... | H01M 10/44 320/107 |
| 2004/0197214 A1 * | 10/2004 | Arthur | ................... | F03G 7/065 417/413.2 |
| 2008/0034750 A1 * | 2/2008 | Gao | ....................... | F03G 7/065 60/527 |
| 2011/0094216 A1 * | 4/2011 | Browne | ................... | F02G 5/00 60/527 |
| 2011/0140456 A1 * | 6/2011 | Wittorf | ................... | F01K 27/00 290/1 R |
| 2012/0216523 A1 * | 8/2012 | Browne | ................ | F03G 7/065 60/527 |

* cited by examiner

THERMAL ENERGY HARVESTING DEVICE

This application claims priority from U.S. Provisional Application Ser. No. 61/482,857 filed on May 5, 2011, which is incorporated herein by reference.

FIELD OF THE INVENTION

In one or more embodiments, the present disclosure is directed to an energy harvesting device that utilizes a shape memory alloy (SMA) to convert thermal energy into electrical energy. In certain embodiments, the SMA may generate rotation in a shaft that is operatively coupled to a generator.

BACKGROUND OF THE INVENTION

Thermal energy harvesting, also referred to as thermal energy scavenging, is the conversion of heat energy into electrical energy. The heat energy may be derived from any available sources, such as, for example, ambient heat in the atmosphere or waste heat generated by industrial chimneys, engines and the like. The electrical energy harvested from the thermal energy may then be used as a power source for a variety of high power or low power applications. For example, a thermal energy harvesting device may be used to generate usable electrical energy for low power sensor applications in remote locations where electrical energy is not otherwise readily available. The increasing global demand for clean sources of energy has caused increased focus and research in the areas of thermal energy harvesting in order to more efficiently capture potential sources of electrical energy, particularly sources that are otherwise wasted.

Use of a shape memory alloy (SMA) in thermal energy harvesting devices is known to those skilled in the art. Shape memory alloys undergo a phase change at a certain temperature that may be used to covert thermal energy to electrical energy. For example, U.S. Pat. No. 8,104,278 (issued Jan. 31, 2012) discloses a thermal energy harvesting device that utilizes an SMA. This patent discloses a system for and method of harvesting, storing and converting naturally occurring energy using a shape memory alloy. However, known thermal energy harvesting devices utilizing an SMA suffer from various disadvantages, including having complex designs.

Thus, there is a need for an improved thermal energy harvesting device including a shape memory alloy element for generating electrical energy.

SUMMARY OF THE INVENTION

In general, a thermal energy harvesting device according to the present disclosure includes a rotatable shaft; and a shape memory alloy element secured to the rotatable shaft, the shape memory alloy element adapted to cause rotation of the shaft upon transition from a martensite phase to an austenite phase.

In accordance with at least one aspect of the present disclosure, a thermal energy harvesting device includes a generator; a rotatable shaft operatively coupled to the generator; a generally helical shape memory alloy element positioned around the rotatable shaft and secured at a first longitudinal end to the rotatable shaft and at a second longitudinal end to a stationary structure, the shape memory alloy element adapted to elongate between the first and second longitudinal ends when subjected to heat and upon transitioning from a martensite phase to a austenite phase; and a rechargeable battery connected to the generator for storing electrical energy produced by the generator.

In accordance with at least one aspect of the present invention, a thermal energy harvesting device includes a gear box; a rotatable shaft operatively connected to the gear box; a shape memory alloy element wrapped around a portion of the rotatable shaft and secured at a first longitudinal end to the rotatable shaft and at a second longitudinal end to a stationary structure, the shape memory alloy element adapted to contract between the first and second longitudinal ends when subjected to heat and upon transitioning from a martensite phase to a austenite phase; a biasing member secured to the rotatable shaft; an electrical energy generating device operatively connected to the gear box and adapted to produce a voltage; and a rechargeable battery connected to the electrical energy generating device to store the electrical energy produced.

BRIEF DESCRIPTION OF THE DRAWINGS

For a full understanding of the invention reference should be made to the following detailed description and the accompanying drawings, wherein.

DETAILED DESCRIPTION OF THE ILLUSTRATIVE EMBODIMENTS

Figure 1:
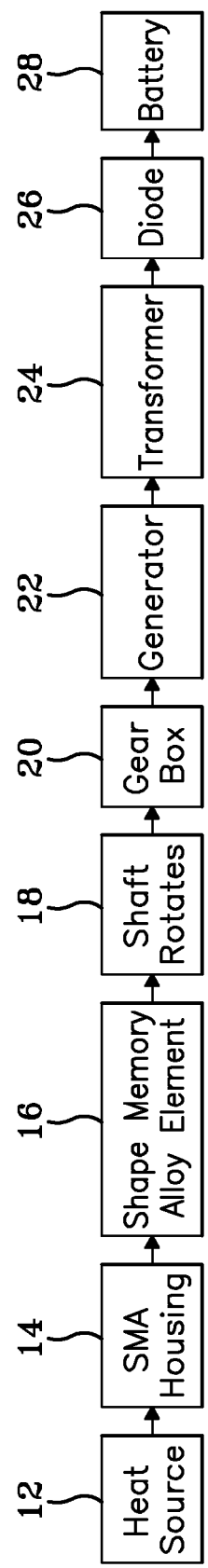
FIG. 1 is a schematic representation showing the flow of energy through a thermal energy harvesting device according to the concepts of the present disclosure.

In one or more embodiments, a thermal energy harvesting device according to the concepts of the present disclosure includes a shape memory alloy (SMA) element. In one or more embodiments, the SMA element may be operatively coupled to a shaft operatively secured to a generator, where rotation of the shaft drives the generator to create electrical energy. In certain embodiments, the electrical energy created by the generator may be stored, such as in a rechargeable battery, for later use. In one or more embodiments, the SMA element and at least a portion of the shaft may be positioned within a chamber equipped with a temperature control mechanism to create increased temperature oscillation within the chamber. In certain embodiment, the SMA element may be provided in a helical configuration around a portion of the shaft.

The SMA element of the present disclosure refers to an element formed from a shape memory alloy (SMA). Shape memory alloys generally refer to a group of metallic materials that possess an ability to return to some previously defined shape or size when subjected to a thermal stimulus. A shape memory alloy transitions between a martensite phase at low temperatures and an austenite phase at high temperatures. The shape memory alloy possesses different material properties, including yield strength, stiffness, dimension and/or shape in the different phases. Generally, in the martensite phase, at lower temperatures, the shape memory alloy is plastically deformable, and upon exposure to an elevated temperature the shape memory alloy will transform to the austenite phase, returning to the shape prior to deformation. Materials that exhibit this shape memory effect only upon heating are referred to as having one-way shape memory. Materials also exist that exhibit the shape memory effect upon cooling and are referred to as having two-way shape memory behavior.

When the shape memory alloy is in the martensite phase and is heated, it begins to change into the austenite phase. The temperature at which the shape memory alloy begins the transition from the martensite phase to the austenite phase may be referred to as the austenite start temperature. The temperature at which the shape memory alloy has completed the transition from the martensite phase to the austenite phase may be referred to as the austenite finish temperature. Similarly, when the shape memory alloy is in the austenite phase and is cooled, it begins to change into the martensite phase. The temperature at which the shape memory alloy begins the transition from the austenite phase to the martensite phase may be referred to as the martensite start temperature. The temperature at which the shape memory alloy has completed the transition from the austenite phase to the martensite phase may be referred to as the martensite finish temperature.

The temperature at which the shape memory alloy transitions from the martensite phase to the austenite phase when heated may be adjusted by altering the composition of the shape memory alloy and through heat treatment during manufacturing. The difference between the austenite start temperature and the austenite finish temperature may be less than 5° C. Similarly, the difference between the martensite start temperature and the martensite finish temperature may be equal to or less than 5° C. The start or finish temperature of the transition between phases may be set to within a couple of degrees of a target temperature during manufacturing of the shape memory alloy thereby providing versatility depending upon the intended use and application of the shape memory alloy.

Suitable shape memory alloy materials include, for example, nickel-titanium based alloys, indium-titanium based alloys, nickel-aluminum based alloys, nickel-gallium based alloys, copper-zinc based alloys, copper aluminum based alloys, copper-gold based alloys, copper-tin based alloys, gold-cadmium based alloys, silver-cadmium alloys, indium-cadmium based alloys, manganese-copper based alloys, iron-platinum based alloys, and iron-palladium based alloys. The alloys may be binary, ternary, or any higher order as long as a shape memory effect is produced.

As will be appreciated by those skilled in the art, the shape memory alloy may be adapted to transition between the martensite phase and the austenite phase at a desired temperature range for use in a particular application. For example, if the thermal energy harvesting device is designed to be placed in a remote location and to generate electric energy from the daily temperature change at that location, the shape memory alloy may be chosen based upon its ability to transition between phases by virtue of that temperature change. In one or more embodiments, the temperature change may be between approximately 27° C. and 58° C. The shape memory alloy may also be chosen based upon the strength of the material and the power output needed to rotate the shaft of the thermal energy harvesting device. In one or more embodiments, the shape memory alloy may be adapted to transition between phases due to the temperature change in the environment of intended use and to provide the necessary strength to rotate the shaft and produce the desired power output.

The thermal energy harvesting device of the present invention converts thermal energy from a heat source 12 into electrical energy, as shown schematically in FIG. 1. In one or more embodiments, the collected thermal energy may be naturally occurring, such as, for example, from the atmosphere, from within the ground and/or from water. In other embodiments, thermal energy may be collected from waste heat produced by other processes. For example, a thermal energy harvesting device may be positioned in a chimney or other exhaust system where heat is released. In certain embodiments, the thermal energy harvesting device may include a housing 14 surrounding and enclosing the components of the device. In a particular embodiment, the housing 14 may have a low thermal capacitance to allow for more rapid temperature changes of the shape memory alloy element. It is also contemplated that the shape memory alloy may be caused to transition between phases by providing electrical stimulation to the shape memory alloy. In certain embodiments the electrical stimulation may be provided through an external source. In other embodiments, the electrical stimulation may be provided from electricity generated by the thermal energy harvesting device itself.

In one or more embodiments, the thermal energy from the heat source 12 is transferred through the housing 14 of the thermal energy harvesting device and causes a shape memory effect in a shape memory alloy element 16, such as, for example, a change in shape or dimension. This shape memory effect drives rotation of a shaft 18. In certain embodiments, heating of the shape memory alloy element 16 may cause contraction of the element to rotate the shaft 18. In other embodiments, heating of the shape memory element 16 may cause elongation of the element along its longitudinal length.

In one or more embodiments, a gear box 20 may be positioned between the shaft 18 and a generator 22 to increase the rotational speed of the generator, and thereby increase the voltage that is created. In certain embodiments, the gear box 20 may be chosen to reduce the friction forces that the shape memory alloy element must overcome to rotate the shaft 18. In one or more embodiments, a relatively large gear ratio may be employed within the gear box 20 to increase the rotational velocity of the generator by several orders of magnitude. The gear box 20 is rotationally coupled to the generator 22 so that rotation of the shaft 18 is transferred to the generator 22. Suitable electric generators 22 for use in the thermal energy harvesting device of the present disclosure will be readily apparent to those skilled in the art. In other embodiments, a pulley system may be provided in lieu of or in addition to a gear box, the pulley system being is adapted to amplify the mechanical energy of the rotating shaft. It is also contemplated that the gear box 20 may be omitted, and the shaft 18 may be operatively coupled directly to the generator 22.

In one or more embodiments, an electrical transformer 24 may be positioned between the generator 22 and a rechargeable battery 28 to amplify the amount of current driven into the rechargeable battery 28. The rechargeable battery 28 may be any type of rechargeable battery known to those skilled in the art. For example, the rechargeable battery 28 may be a nickel metal hydride (NiMH) battery, a nickel zinc (NiZn) rechargeable battery, or a lithium ion rechargeable battery. In one or more embodiments, a capacitor may be used in lieu of a rechargeable battery to store electrical energy. In any case, the rechargeable battery (or capacitor) is capable of storing electrical energy produced by the generator 22 for later use. It is also contemplated that the electrical transformer may be omitted, and the current may pass directly from the generator 22 to the rechargeable battery 28.

In certain embodiments, a diode 26 may optionally be positioned between the generator 22 and rechargeable battery 28 to only allow current flow from the generator 22 to the rechargeable battery 28. Thus, the diode 26 prevents an electric charge from being drawn from the rechargeable battery 28 when the shaft 18 rotates in the opposite direction to return the shape memory alloy element to its unheated (martensite) starting shape/position. In other embodiments, an electrical or mechanical switch may be employed in lieu of the diode to disconnect the rechargeable battery from the circuit while the SMA element returns to its initial shape. Suitable switches will be apparent to those skilled in the art.

Figure 2:
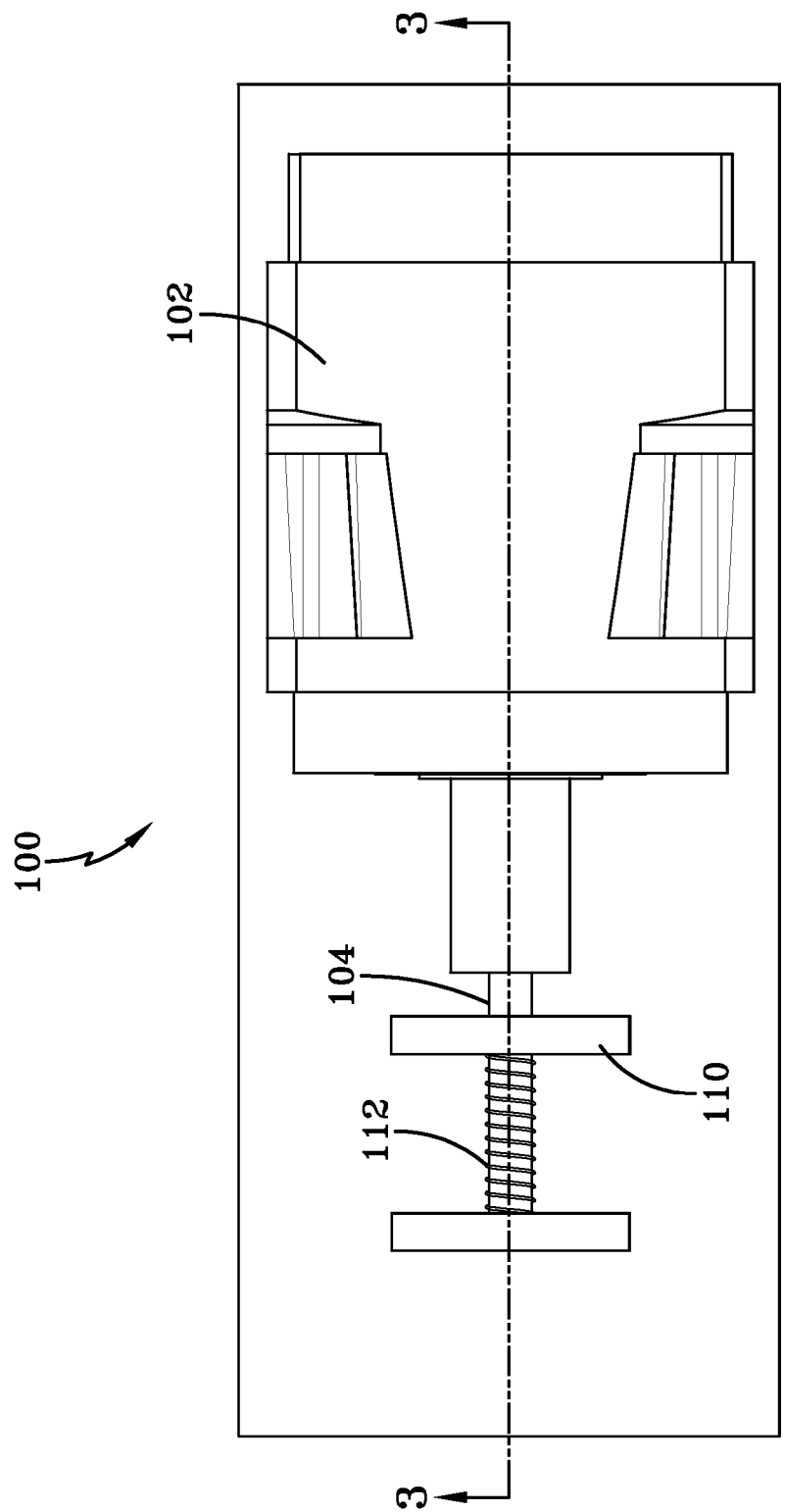
FIG. 2 is a top view of a portion of a thermal energy harvesting device according to the concepts of the present disclosure.
Figure 3:
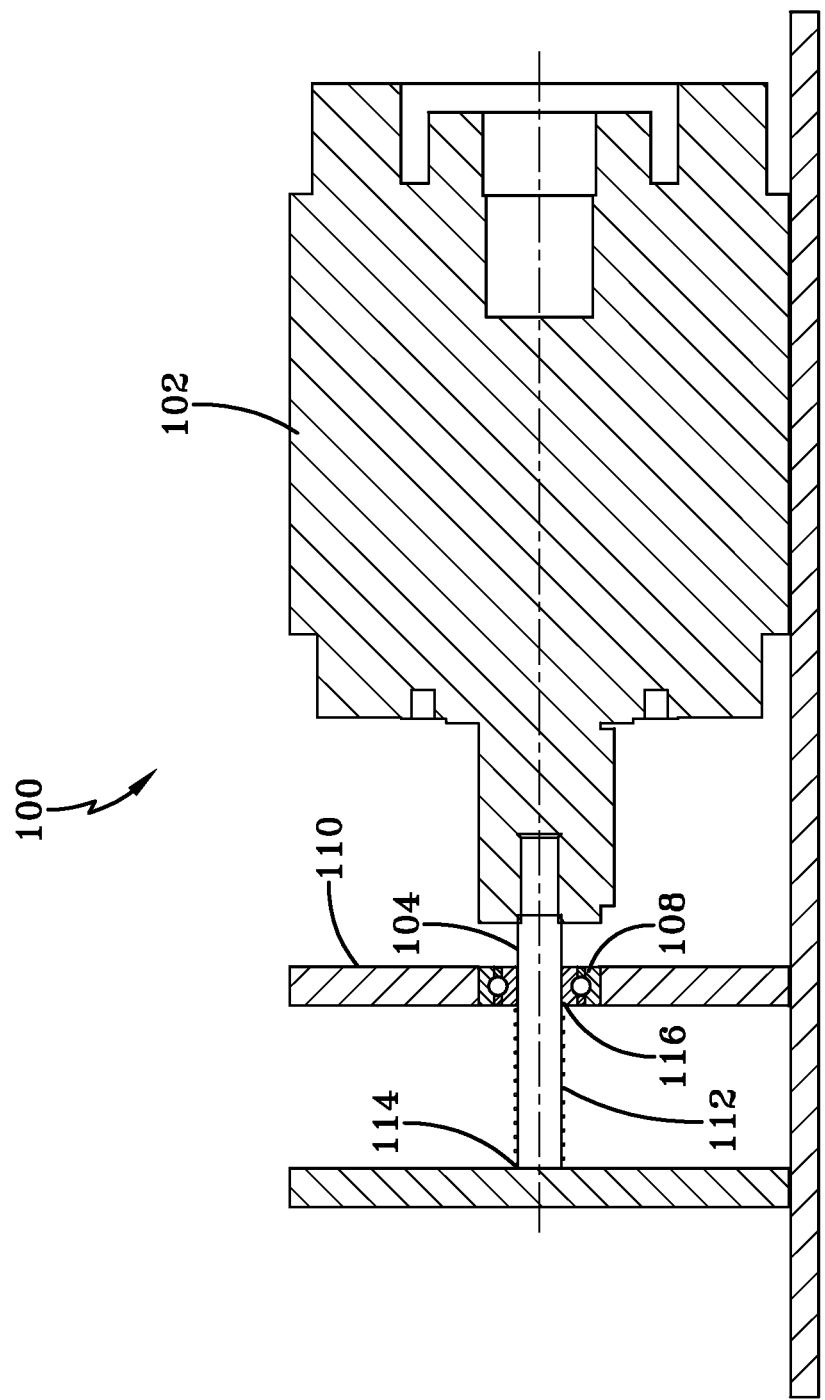
FIG. 3 is a section view of the thermal energy harvesting device taken generally along line 3-3 of FIG. 2.
Figure 4:
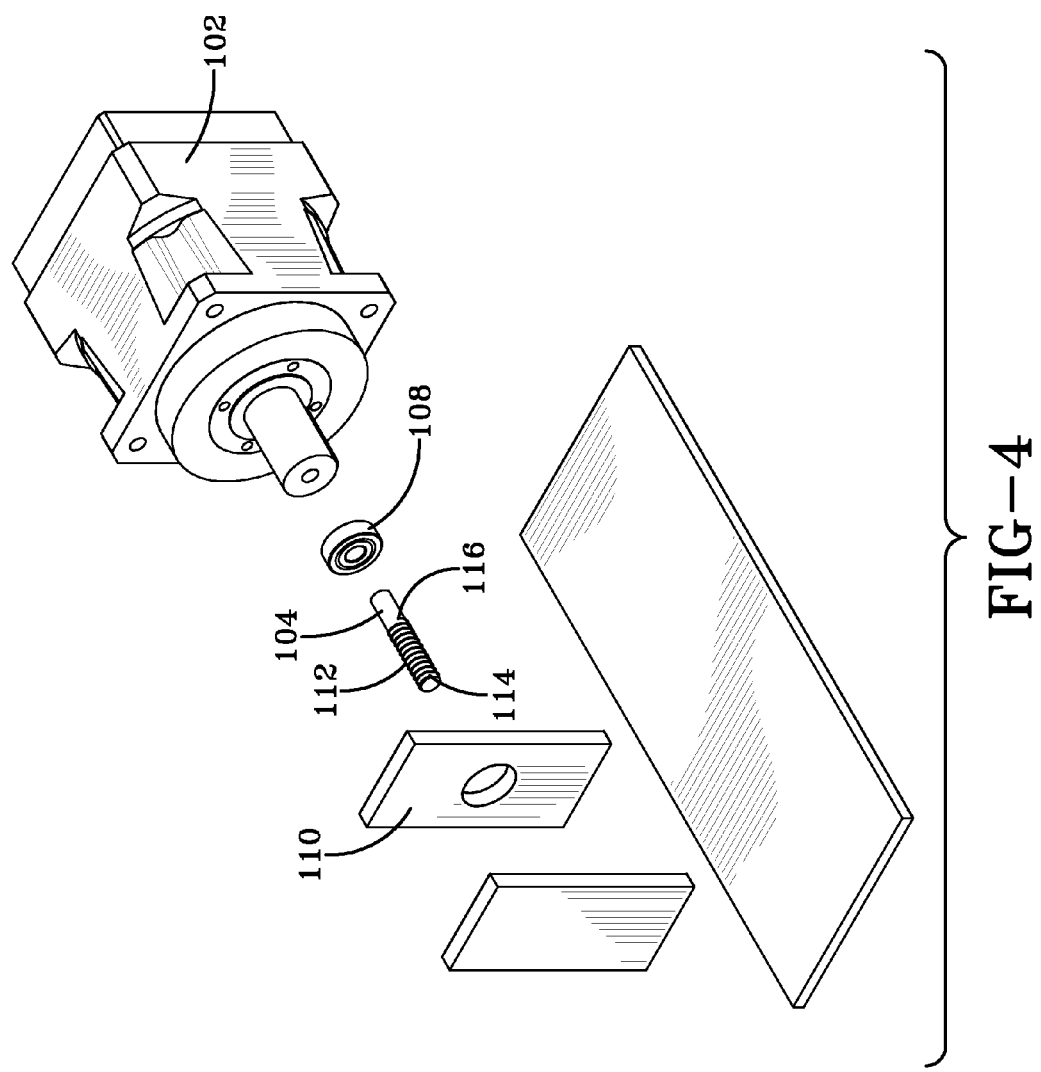
FIG. 4 is an exploded perspective view of the thermal energy harvesting device.
Figure 5:
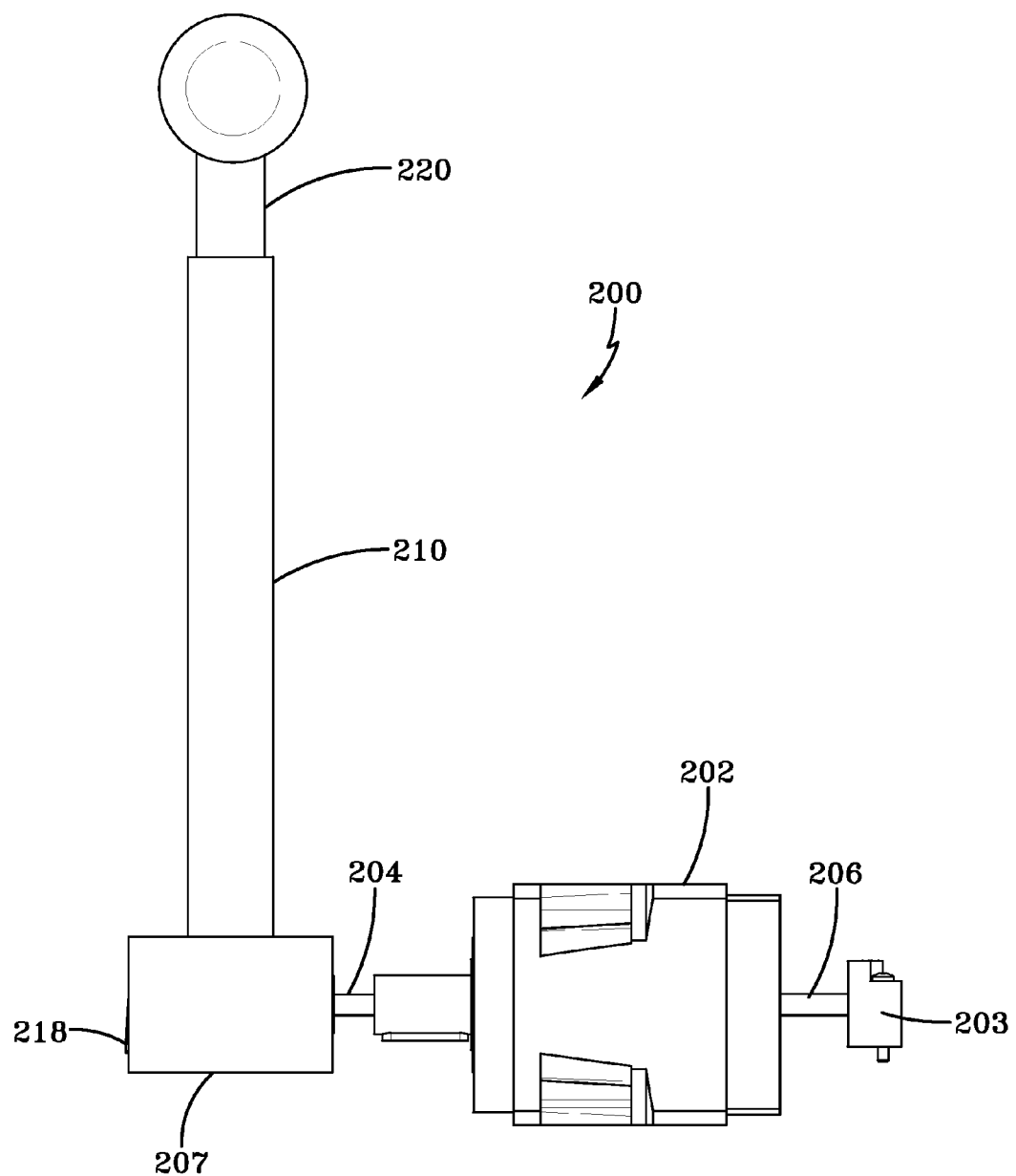
FIG. 5 is a side view of another embodiment of a thermal energy harvesting device according to the concepts of the present disclosure.
Figure 6:
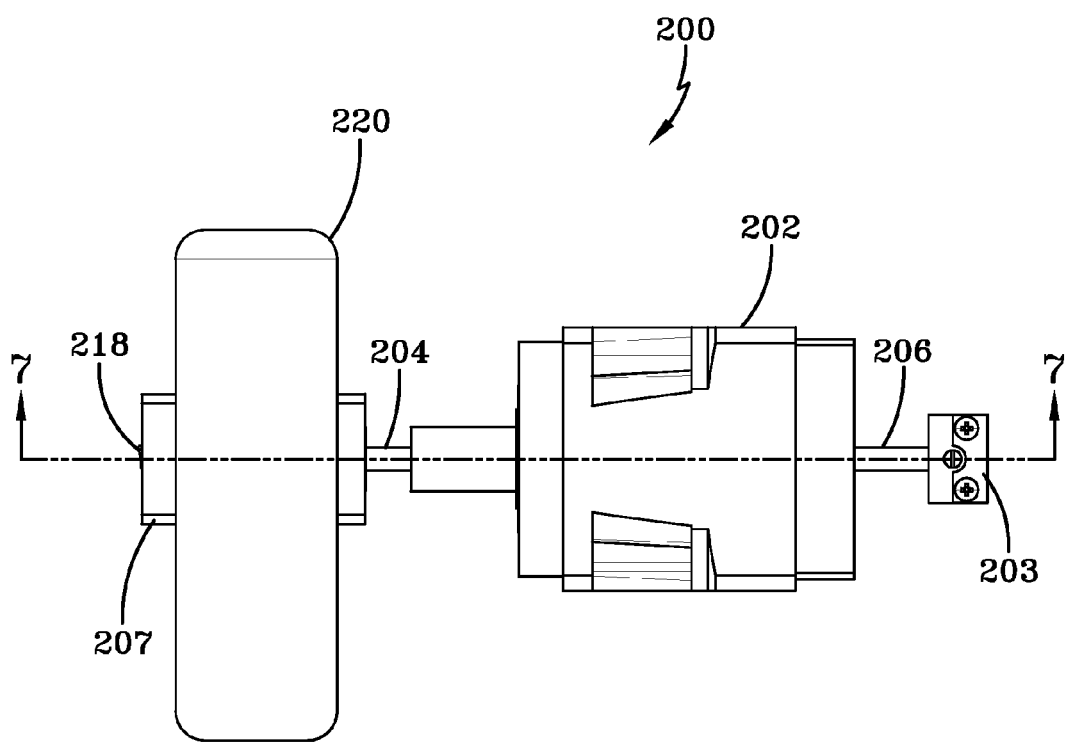
FIG. 6 is a top view of the thermal energy harvesting device of FIG. 5.
Figure 7:
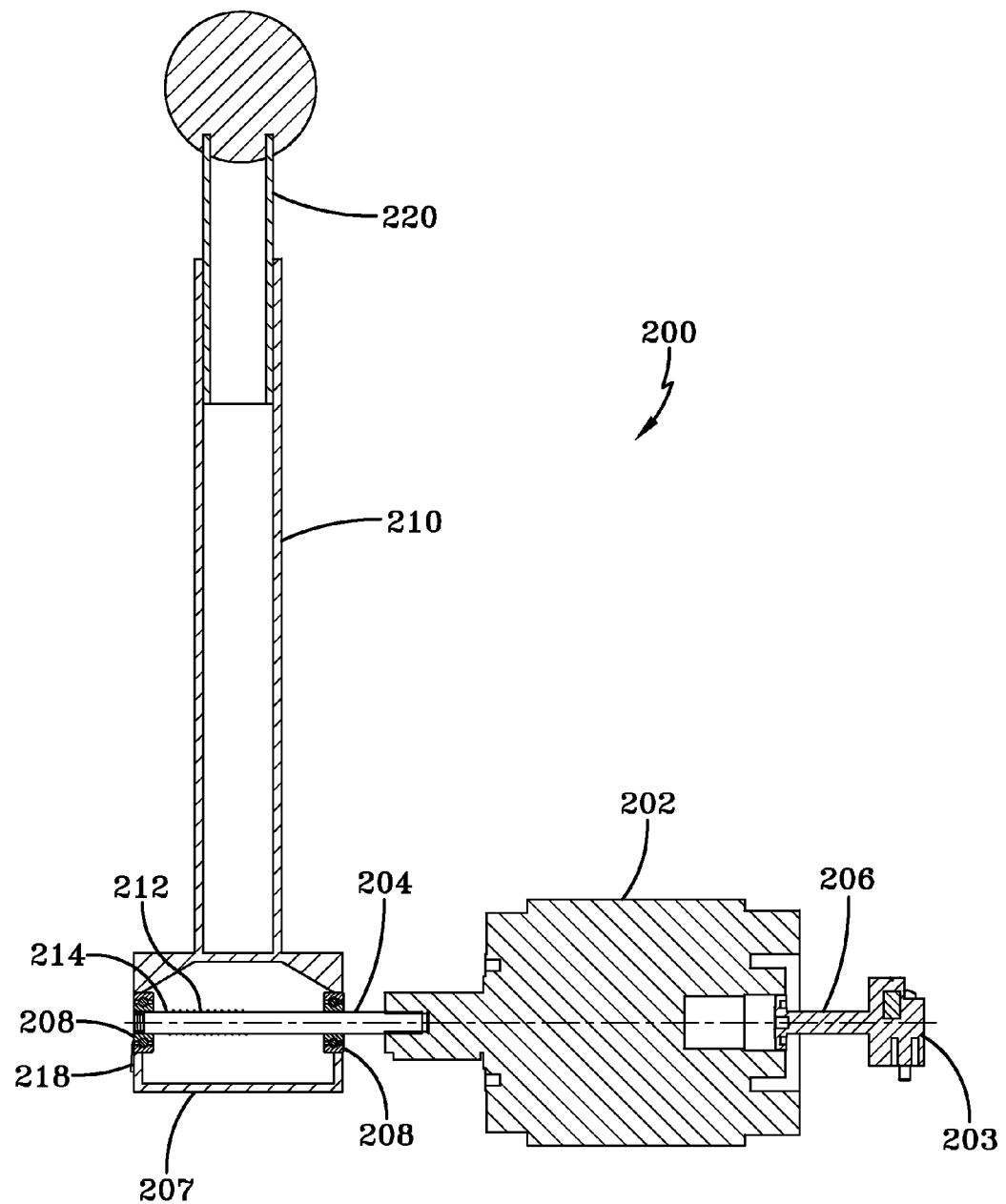
FIG. 7 is a section view of the thermal energy harvesting device taken generally along line 7-7 of FIG. 6.
Figure 8:
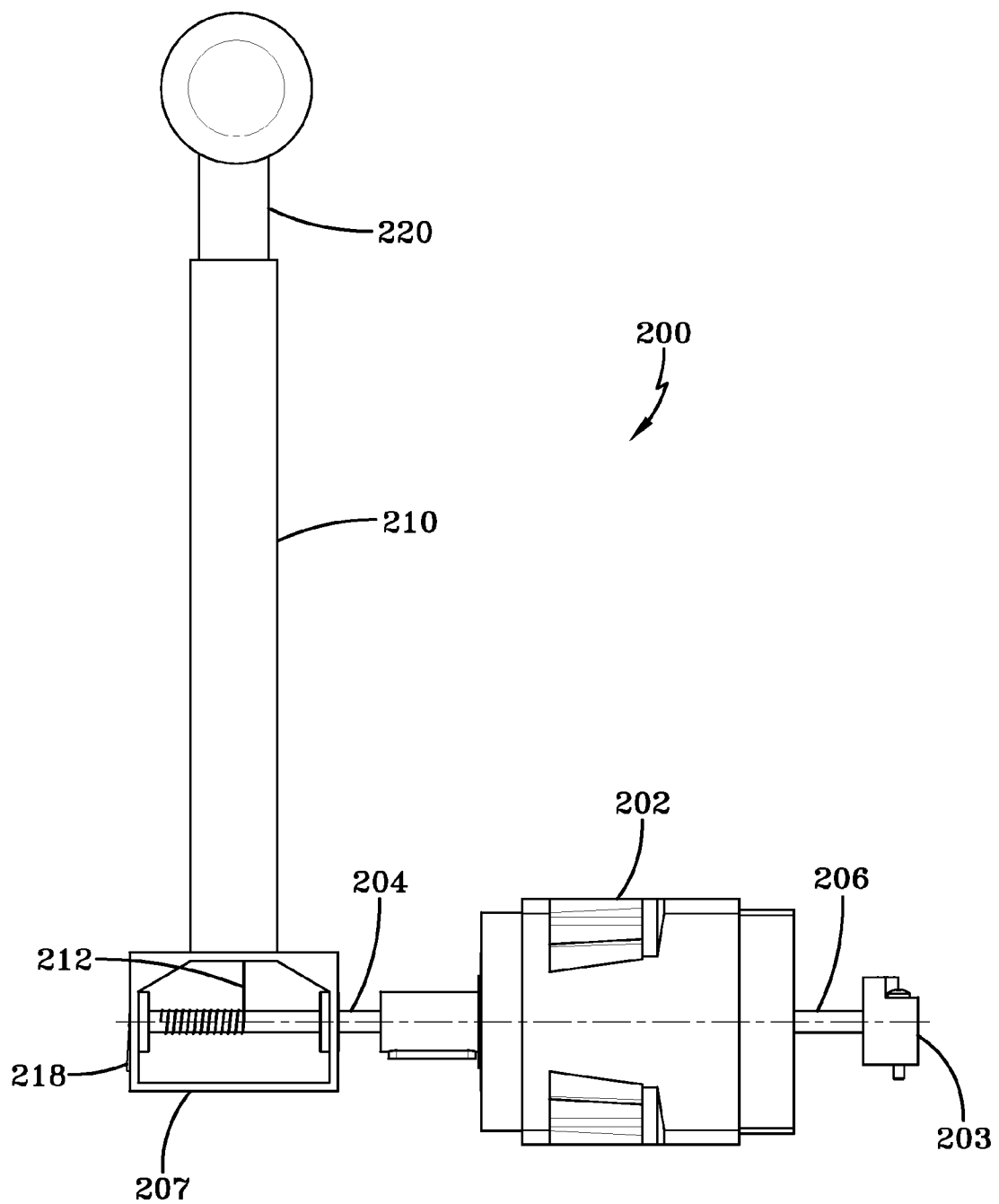
FIG. 8 is a partially exposed side view of the thermal energy harvesting device of FIG. 5 showing the SMA element.
Figure 9:
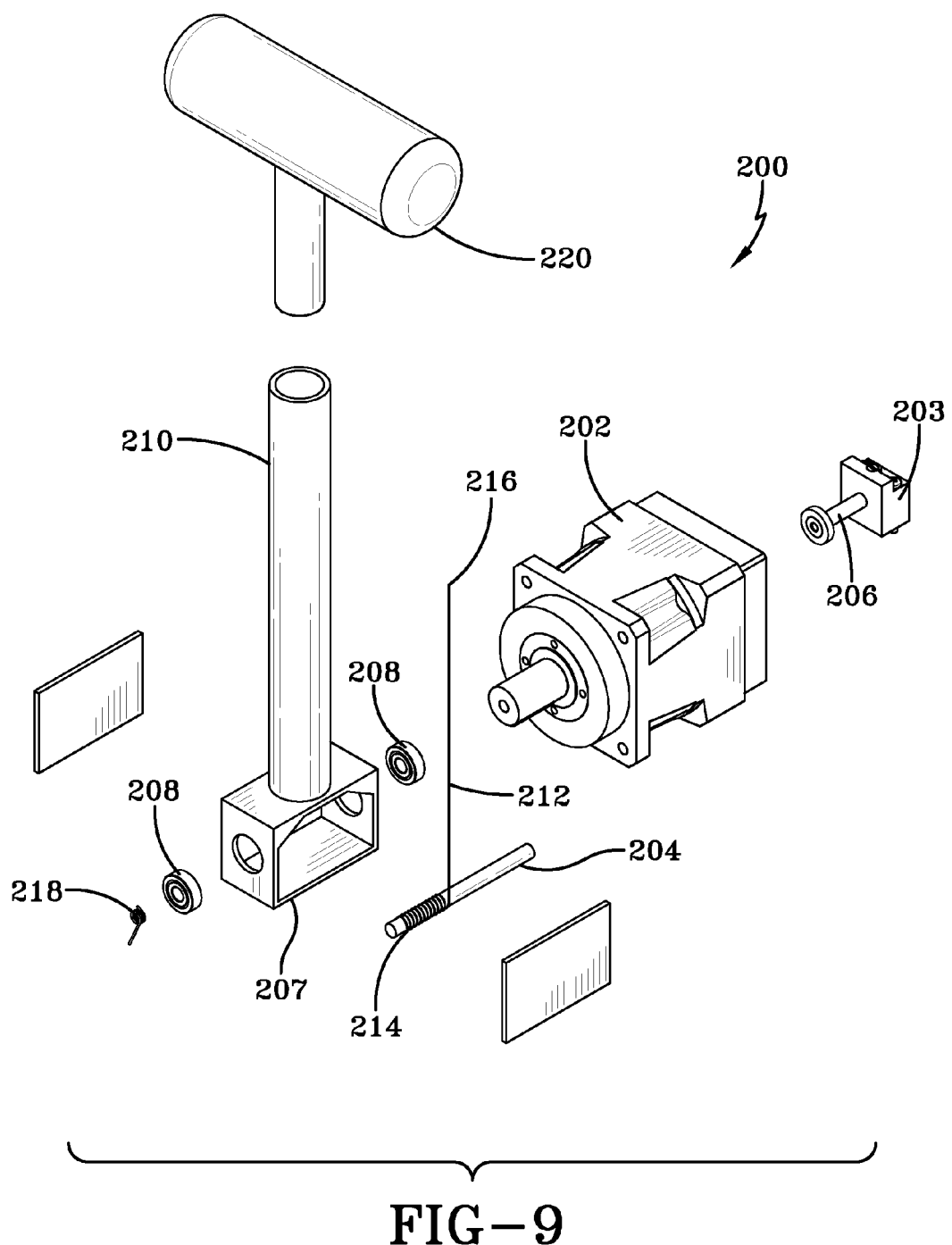
FIG. 9 is an exploded perspective view of the thermal energy harvesting device of FIG. 5.

Referring now to FIGS. 2-4, a thermal energy harvesting device according to the concepts of the present disclosure is shown, and is indicated generally by the numeral 100. The thermal energy harvesting device 100 includes a generator 102 and a rotatable shaft 104 operatively coupled to the generator 102. Rotation of the shaft 104 drives the generator and creates electrical energy, which may be stored in an electrical energy storage component, such as, for example, a rechargeable battery.

At least a portion of the shaft 104 is positioned within a housing (not shown). In certain embodiments, the shaft 104 and generator 102 may both be positioned within the housing. The shaft 104 may be supported by a bearing 108 positioned within a support member 110 of the housing 106. A shape memory alloy (SMA) element 112 is arranged helically around a portion of the shaft 104, with one end 114 of the SMA element secured to the shaft 104, and the opposite end 116 secured to the housing 106 or another stationary, non-rotatable structure, or otherwise prevented from movement. In the embodiment shown, the first end 114 of the SMA element 112 is attached at a distal end of the shaft 104, and the second end 116 of the SMA element 112 is attached to the support member 110 of the housing 106.

When the housing 106 is heated, a portion of the heat is transferred to the SMA element. Upon reaching a transition temperature, the SMA element transitions from the martensite phase to the austenite phase, and in so doing elongates along the longitudinal length of the helical element. As will be appreciated by those skilled in the art, the lengthening of the helical SMA element upon transition to the austenite phase causes rotation of the shaft 104 due to the helical arrangement of the SMA element and the fixed end 116. As discussed above, rotation of the shaft 104 drives the generator 102 and causes the creation of electrical energy, which may be stored in a rechargeable battery. When the SMA element cools and reaches a transition temperature, the helical SMA element transitions back to the martensite phase and thereby contracts along its longitudinal length, returning the shaft 104 to its starting position. In this arrangement, including the helical SMA element, no return spring is needed to return the shaft and SMA element to their original martensite phase positions.

Referring now to FIGS. 5-10, another embodiment of a thermal energy harvesting device according to the concepts of the present disclosure is shown and is indicated generally by the numeral 200. The thermal energy harvesting device 200 includes a gear box 202 and a rotatable shaft 204 operatively coupled to the gear box 202. Rotation of the rotatable shaft 204 drives the gear box 202, which drives a tachometer 203 that creates a voltage proportional to the velocity of rotation of the output shaft 206 of the gearbox 202. While a tachometer is shown and described in the thermal energy harvesting device 200, it will be appreciated by those skilled in the art that a generator may be provided in lieu of the tachometer, as discussed above with respect to the thermal energy harvesting device 100.

The voltage generated by the tachometer 203 may be stored in an electrical energy storage component, such as, for example, a rechargeable battery. The gear box 202 increases the speed of rotation of the output shaft 206 of the gearbox 202 as compared to the speed of rotation of the rotatable shaft 204. At least a portion of the rotatable shaft 204 is positioned within a housing 207 and in certain embodiments may be rotatably supported in one or more bearings 208 secured to the housing 207. In one or more embodiments, the housing 207 may be positioned within or adjacent to a heat source, such as, for example, a chimney 210 where heated gasses or fumes are exhausted.

A shape memory alloy (SMA) element 212 is connected to the rotatable shaft 204 and is adapted to cause rotation thereof. It certain embodiments, and as shown in FIGS. 5-10, the SMA element may be wrapped around the rotatable shaft 204 and secured at a first end 214 directly to the rotatable shaft 204. In one or more embodiments, the first end 214 of the SMA element 212 may be connected to a flexible element that is wrapped around the rotatable shaft, and may therefore by indirectly coupled to the rotatable shaft 204. A second end 216 of the SMA element, opposite the first end 214, may be secured to the housing 207, chimney 210, or another stationary object, or be otherwise prevented from movement. The SMA element 212 is adapted to contract as it transitions from the martensite phase to the austenite phase upon exposure to heat. As will be appreciated by those skilled in the art, contraction of the SMA element 212 causes rotation of the rotatable shaft 204, thereby driving the gear box 202 and tachometer 203 to create electric energy. A biasing member 218, such as, for example, a torsion spring, may be secured to the rotatable shaft 204 to return the shaft and the SMA element to their original martensite position and/or shape upon cooling.

In certain embodiments, a plurality of SMA elements may be connected to the rotatable shaft 204, the SMA elements having different austenite-martensite transition temperature ranges. In this way the rotatable shaft 204 may be caused to rotate in opposing directions by two or more different SMA elements. Oscillatory motion of the rotatable shaft 204 is created by the opposing mechanical forces of the SMA elements.

Figure 10:
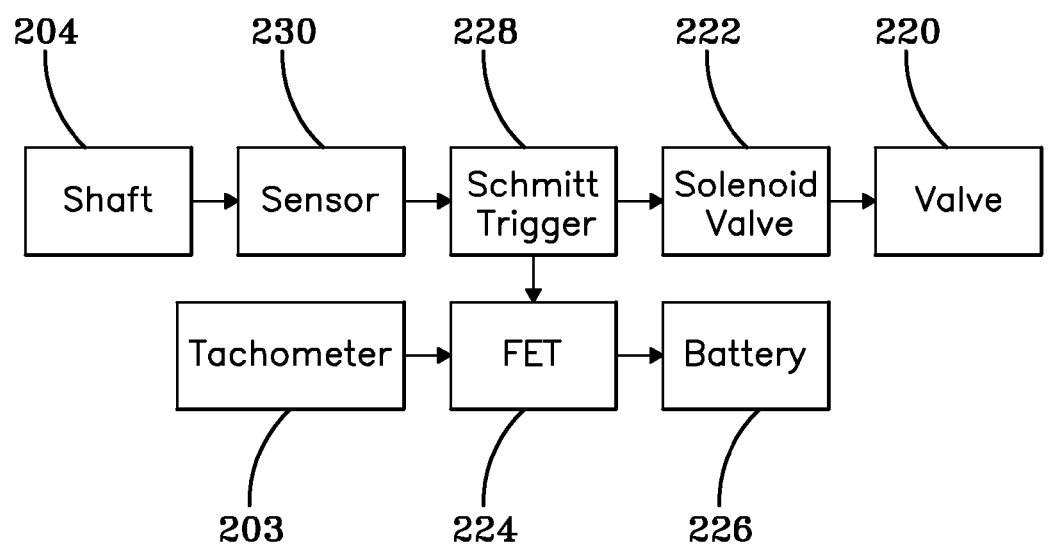
FIG. 10 is a schematic diagram of the electric circuit used to control the thermal energy harvesting device of FIG. 5.

In one or more embodiments, a feedback control system may be used to create a thermally oscillating system, thereby causing continual contraction and elongation of the SMA element. The feedback control system, as shown in FIG. 10, may include a solenoid valve 222 that causes opening and closing of a valve 220 so that the temperature within the chimney 210 and housing 207 may be regulated. In certain embodiments, the solenoid valve may be chosen to be normally open since the SMA element 212 may require greater time to elongate than to contract. This will reduce the energy consumption of the solenoid valve and, consequently, of the system. The valve 220 may be any suitable valve mechanism known to those skilled in the art and suitable for use in the thermal energy harvesting device of this disclosure. In certain embodiments, opening of the valve 220 may allow a cooling or heating medium to flow through the chimney 210 or housing 207 to provide more rapid temperature reduction or increase, and closing of the valve 220 may cause the flow of cooling or heating medium to cease. This cooling or heating effect, when provided, may allow for more rapid transitions of the SMA element between the austenite and martensite phases. Another valve or plurality of valves can be opened and closed to permit the cooling or heating medium to exit the thermal energy harvesting device thereby creating more rapid thermal oscillations.

In one or more embodiments, the feedback control system may include a field effect transistor (FET) 224 to disconnect the tachometer 203 from the rechargeable battery 226 so that stored energy will not be withdrawn from the rechargeable battery when the biasing member 218 returns the system to its original state. An exemplary field effect transistor is FET 5LN02C manufactured by Sanyo (Tokyo, Japan). A Schmidt trigger 228 may be used to control actuation of the field effect transistor 224. The Schmidt trigger 228 uses a feedback signal from a Hall Effect sensor 230 connected to the rotatable shaft 204, the Hall Effect sensor 230 adapted to indicate when the SMA element 212 has achieved maximum contraction. An exemplary Hall Effect sensor 230 is the sensor model A1321 made by Allegro MicroSystems, Inc.

Upon maximum contraction of the SMA element 212, the Schmidt trigger 228 is actuated based upon the signal from the Hall Effect sensor 204, and the solenoid 222 may be opened to allow heat to escape the chimney 210. At the same time, the Schmidt trigger 228 causes the field effect transistor 224 to disconnect the tachometer 203 from the rechargeable battery 226. In certain embodiments, the electrical components of the system may be powered by the rechargeable battery 226, which may initially be provided with a nominal amount of electrical energy.

In one or more embodiments, any combination of the gearbox, generator, diode or transformer may be omitted from the thermal energy harvesting devices 100, 200 disclosed herein. In certain embodiments, contractions and/or elongations of the SMA element due to fluctuations in thermal energy may be converted into mechanical energy or motion. For example, the thermal energy harvesting device may generate mechanical motion such as stirring or mixing, and may be devoid of electrical energy generating and storage devices. In these embodiments, the thermal energy is converted into mechanical motion that is immediately utilized at the time of conversion. Mechanical devices to covert the rotation of a rotatable shaft into the desired mechanical motion will be readily apparent to those skilled in the art.

It is thus evident that a thermal energy harvesting device constructed as described herein substantially improves the art. Only particular embodiment(s) have been presented and described in detail, and the invention should not be limited by the drawings or the description provided. For an appreciation of the true scope and breadth of the invention, reference should be made only to the following claims.

What is claimed is:

1. A thermal energy harvesting device comprising:
a rotatable, unitary shaft, a housing, and a shape memory alloy element secured to said shaft and generally helically wrapped around, and in substantial contact with, a portion of said shaft, the shape memory alloy element adapted to cause rotation of said shaft upon transition from a martensite phase to an austenite phase to thereby create electrical energy, said shape memory alloy element having a first end secured directly to said shaft and an opposing end secured to a stationary structure to thereby prevent said opposing end from movement, said housing surrounding only said shape memory alloy element and a portion of said rotatable shaft, said housing adapted for exposure to a single cooling or heating medium, said single cooling or heating medium alternating between a cooling medium and a heating medium.

2. The thermal energy harvesting device of claim 1, where said shaft is operatively coupled to a generator for creating electric energy.

3. The thermal energy harvesting device of any one of claim 1 or 2, where said shaft is operatively coupled to a gear box having an output shaft, the gear box adapted to increase the speed of rotation so that the speed of rotation of said output shaft is greater than the speed of rotation of said rotatable shaft.

4. The thermal energy harvesting device of claim 2, where the shape memory alloy element has a longitudinal length, and where the shape memory alloy element is adapted to contract along the longitudinal length when transitioning from the martensite phase to the austenite phase.

5. The thermal energy harvesting device of claim 4, further comprising a biasing member connected to said shaft for returning said shaft to its original position following cooling of the shape memory alloy element.

6. The thermal energy harvesting device of claim 2, where the shape memory alloy element has a longitudinal length, and where the shape memory alloy element is adapted to elongate along the longitudinal length when transitioning from the martensite phase to the austenite phase.

7. The thermal energy harvesting device of claim 2, where said generator is connected to a rechargeable battery for storing electric energy produced by the generator.

8. The thermal energy harvesting device of claim 7, further comprising a transformer positioned between the generator and rechargeable battery for increasing the current supplied to the rechargeable battery.

9. The thermal energy harvesting device of claim 7, further comprising a diode positioned between said generator and said rechargeable battery to allow current to flow only from the generator to the rechargeable battery and to prevent an electric charge from being drawn from the rechargeable battery.

10. The thermal energy harvesting device of claim 1, where said shaft is operatively connected to a device for generating mechanical motion, wherein rotation of the shaft is converted into either rotational or linear mechanical motion.

11. The thermal energy harvesting device of claim 10, further comprising one solenoid valve for controlling the temperatures that the shape memory alloy element is subjected to and increasing the rate of temperature change.

12. The thermal energy harvesting device of claim 11, where the solenoid valve is movable between an open position to allow flow of the cooling medium and a closed position that prevents flow of the cooling medium.

13. A thermal energy harvesting device comprising:
a generator; a rotatable, unitary shaft operatively coupled to said generator; one generally helically shaped memory alloy element positioned around said rotatable, unitary shaft and secured at a first longitudinal end directly to said rotatable, unitary shaft and at a second longitudinal end to a stationary structure to thereby prevent said second longitudinal end from movement, said shape memory alloy element adapted to elongate between said first and second longitudinal ends when subjected to heat and upon transitioning from a martensite phase to an austenite phase to thereby create electrical energy; a housing surrounding only said shape memory alloy element and a portion of said rotatable shaft, said housing adapted for exposure to a single cooling or heating medium, said single cooling or heating medium alternating between a cooling medium and a heating medium; and a rechargeable battery connected to said generator for storing electrical energy produced by said generator.

14. The thermal energy harvesting device of claim 13, further comprising a gear box having an output shaft, said gear box positioned between said rotatable, unitary shaft and said generator and adapted to increase or decrease the speed of rotation so that said output shaft has a greater or lower speed of rotation than said rotatable, unitary shaft.

15. The thermal energy harvesting device of claim 13, further comprising a transformer positioned between said generator and said rechargeable battery for increasing the current supplied to said rechargeable battery.

16. The thermal energy harvesting device of claim 13, further comprising a diode or a switch positioned between said generator and said rechargeable battery for preventing an electric charge from being withdrawn from said rechargeable battery.

17. A thermal energy harvesting device comprising:
a gear box; a rotatable shaft operatively connected to said gear box; a shape memory alloy element generally helically wrapped around a portion of said rotatable shaft and secured at a first longitudinal end to said rotatable shaft and at a second longitudinal end to a stationary structure to thereby prevent said second longitudinal end from movement, said shape memory alloy element adapted to contract between said first and second longitudinal ends when subjected to heat and upon transitioning from a martensite phase to a austenite phase; a housing surrounding only said shape memory alloy element and a portion of said rotatable shaft, said housing adapted for exposure to a single cooling or heating medium, said single cooling or heating medium alternating between a cooling medium and a heating medium; an electrical energy generating device operatively connected to said gear box and adapted to convert rotation of said rotatable shaft into electrical energy; and a rechargeable battery connected to said electrical energy generating device to store the electrical energy produced.

18. The thermal energy harvesting device of claim 17, where said electrical energy generating device is selected from a generator and a tachometer.

19. The thermal energy harvesting device of claim 17, further comprising one solenoid valve in communication with said housing, said solenoid valve being movable between an open position and a closed position for controlling the temperature within the housing.

20. The thermal energy harvesting device of claim 19, further comprising a feedback control system for opening and closing said solenoid valve to create a thermally oscillating environment.

21. The thermal energy harvesting device of claim 19, where said solenoid valve permits the cooling medium to flow through said housing when in the open position and prevents flow of the cooling medium when in the closed position.

22. The thermal energy harvesting device of claim 1, where the thermal energy harvesting device is devoid of a spring for returning said shaft and said shape memory alloy to their original martensite phase positions.

* * * * *